March 15, 1966  H. SCHMIDT, JR., ET AL  3,240,338
FILTER APPARATUS
Filed Aug. 30, 1961  4 Sheets-Sheet 1
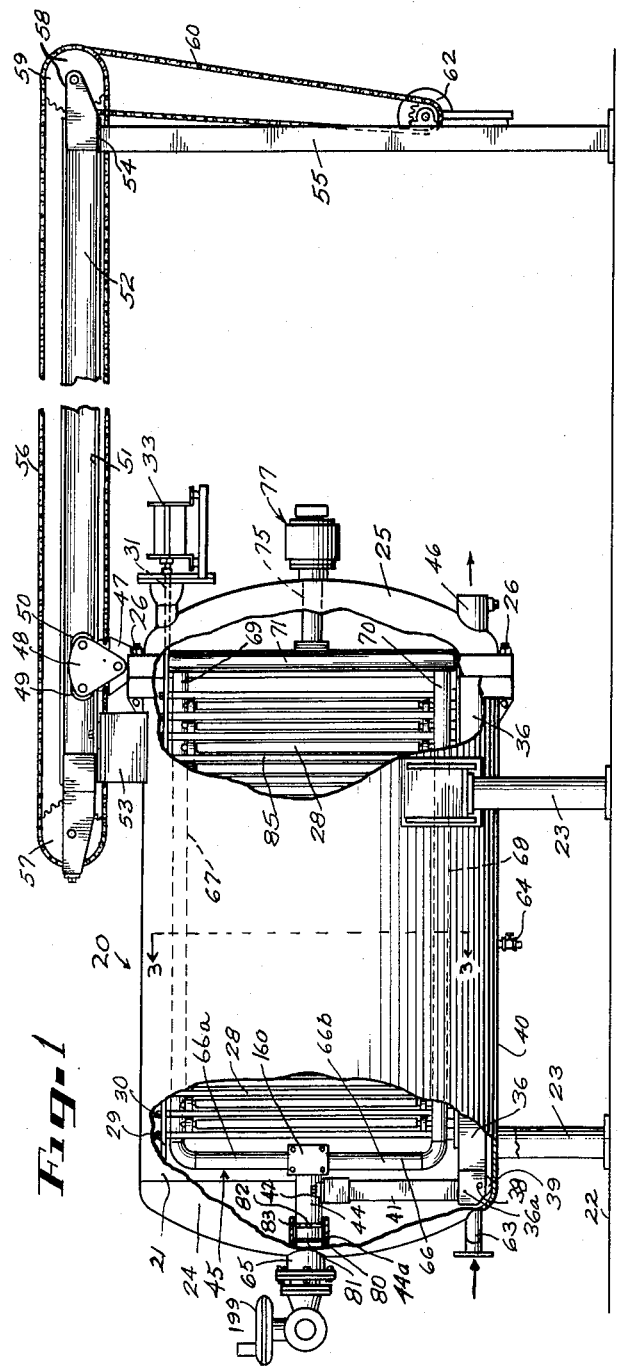
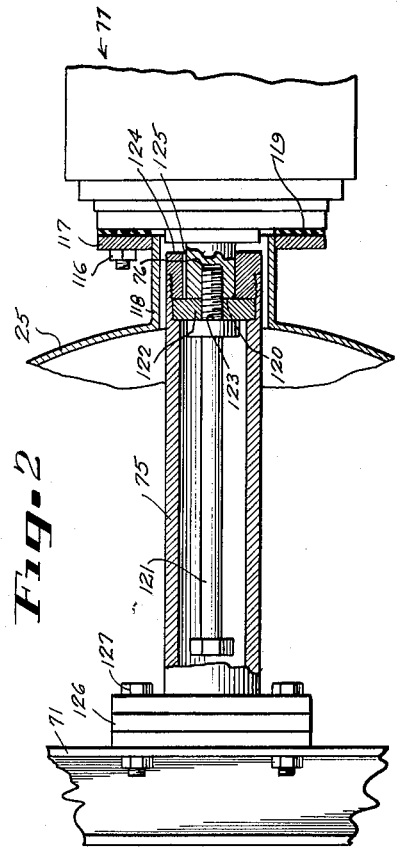
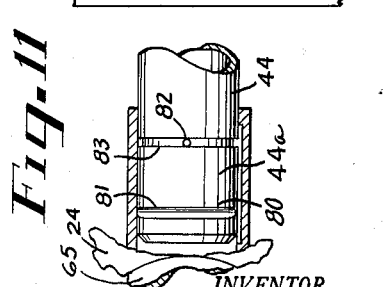
INVENTOR
Henry Schmidt, Jr.
BY & Earl A. Borre
ATTORNEYS

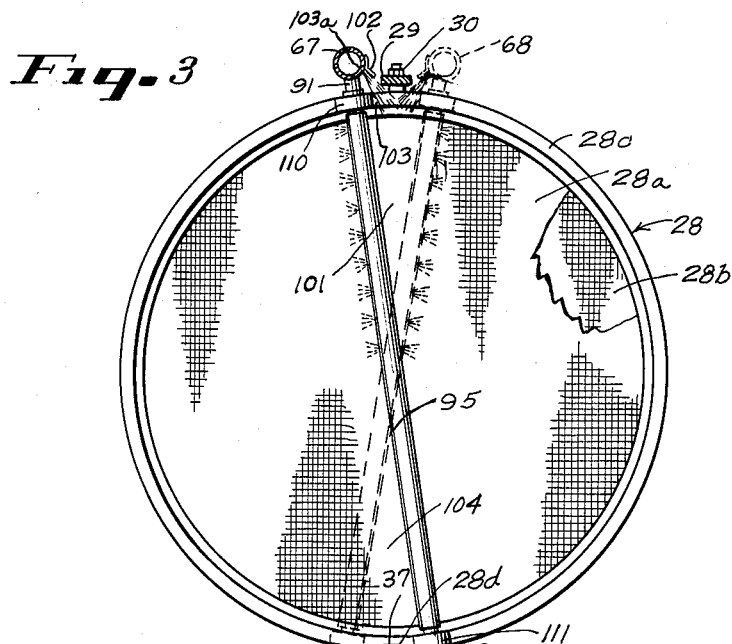
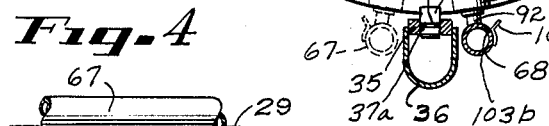
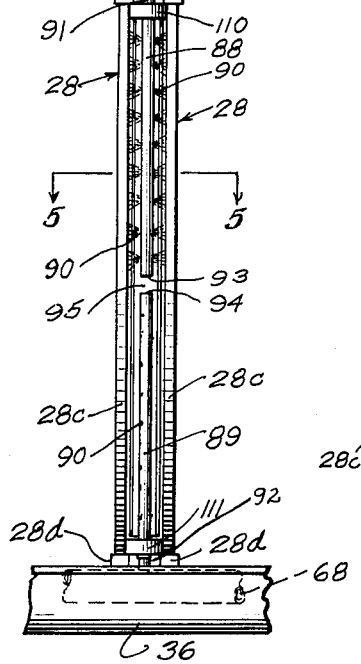
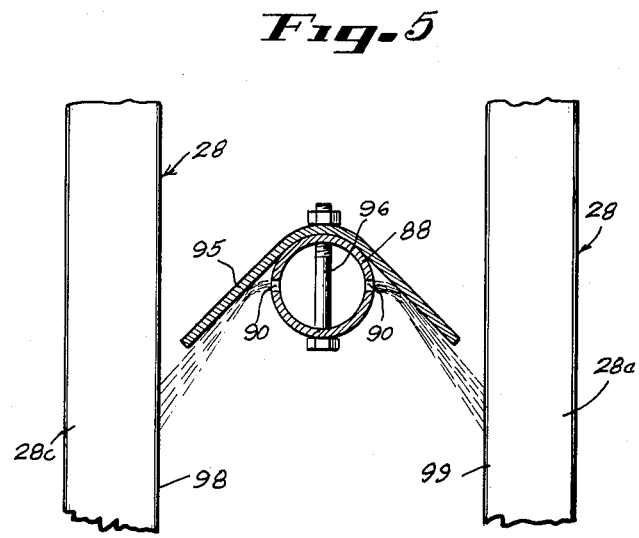

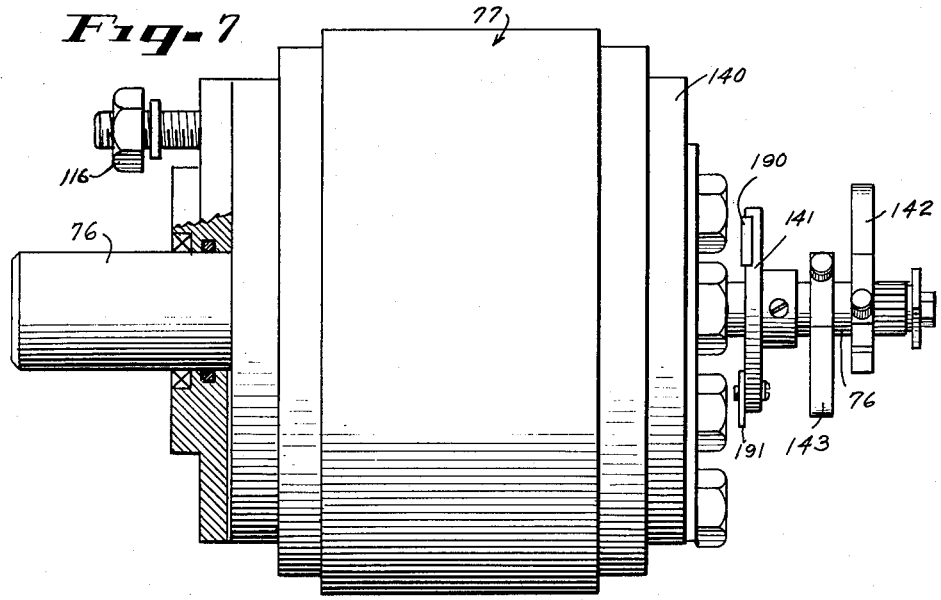
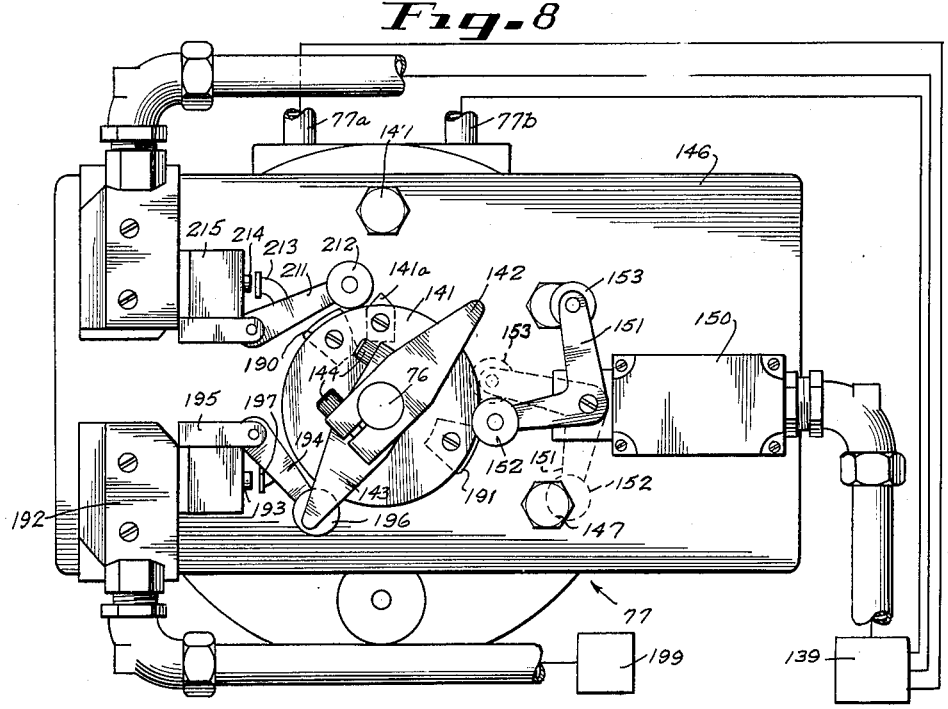

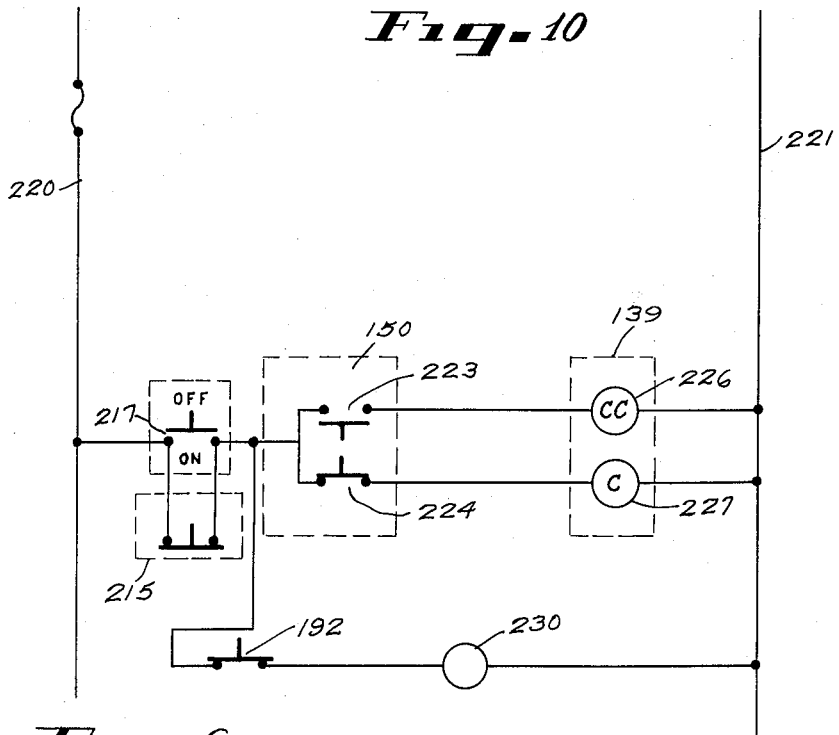
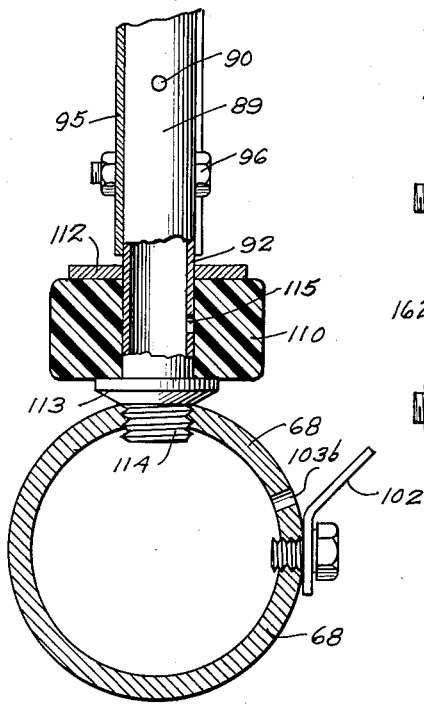
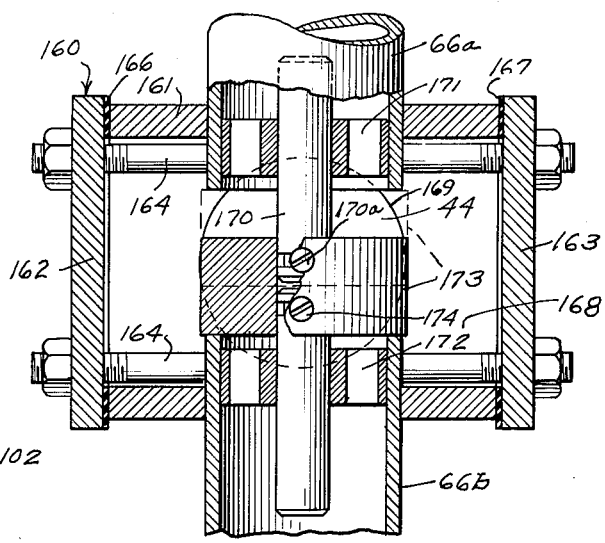

United States Patent Office 3,240,338
Patented Mar. 15, 1966

3,240,338
FILTER APPARATUS
Henry Schmidt, Jr., 17W269 Hillside Lane, Hinsdale, Ill., and Earl A. Borre, Itasca, Ill.
Filed Aug. 30, 1961, Ser. No. 135,016
24 Claims. (Cl. 210—141)

This invention relates to filters and it is more particularly directed to new and improved oscillatory sluicing means for cleaning pressure leaf type filter units.

In the operation of filters of this type, periodic cleaning and general maintenance of the filter is necessary. In one type of pressure filter, the liquid to be clarified flows through a plurality of filter leaves and the entrained solids in the liquid accumulate on the outer surfaces of the filter leaves and form porous cakes which can build up to a point where they reduce considerably the efficiency of the filter and, in some cases, can cause damage to the filter leaves. Various attempts have heretofore been made to remove filter cake from the leaves by employment of sluicing assemblies which direct high velocity jets of a cleaning fluid, such as water, onto the filter cakes accumulated on the filter leaves.

Therefore, an object of the present invention is to provide a multiple leaf type filter unit having a new and improved oscillatory sluicing mechanism.

Another object of the present invention is to provide a new and improved multiple leaf type filter unit which achieves removal of filter cake from a plurality of filter leaves with high velocity sluicing fluid jets supplied by an oscillatory sluicing mechanism.

A further object of the present invention is to provide for a multiple leaf type filter an oscillatory sluicing mechanism having a quick connect-disconnect inlet coupling for connecting the sluicing assembly to a source of sluicing fluid.

A still further object of the present invention is to provide a new and improved sluicing system which employs sluicing fluid as a lubricant for the sluicing fluid inlet coupling of an oscillatory sluicing assembly of a multiple leaf type filter.

Another object of the present invention is to provide an oscillatory sluicing assembly which includes a spray lateral tube for supplying sluicing fluid onto the facing filter surfaces of a pair of adjacent filter leaves.

Still another object of the present invention is to provide a new and improved oscillatory sluicing assembly which provides support for the filter leaves of a multiple leaf type filter.

A still further object of the present invention is to provide an oscillatory sluicing assembly for a multiple leaf type filter unit in which flow of the sluicing fluid onto the effective filtering area of each of the filter leaves is controlled in such a manner that such flow is directed into the filter cake only in the direction of travel of the assembly to impart maximum sluicing action during each cycle of oscillation of the sluicing assembly.

Another object of the present invention is to provide a filter unit having a plurality of spaced, stationary filter leaves and an oscillatory sluicing assembly which is automatically controlled to cyclically spray sluicing fluid onto the effective filtering area of each filter leaf in a manner adapted to provide maximum sluicing action with the use of a minimum amount of sluicing fluid.

A further object of the present invention is to provide an automatic flow control system for cyclically regulating the direction of flow of a sluicing fluid through an oscillatory sluicing assembly for cleaning a filter unit including a plurality of filter leaves, between adjacent filter leaves of which are carried a pair of coaxially aligned sluice lateral tubes in such a manner that the sluicing fluid is selectively supplied to either one or the other of the pair of corresponding and coaxially aligned sluicing lateral tubes in response to the position of the lateral tubes relative to the filter leaves to thereby effectively clean substantially the entire facing filter areas of the adjacent filter leaves wtih employment of a minimum amount of sluicing fluid.

Yet another object of the present invention is to provide an improved method of sluicing multiple filter leaves of a filter unit.

The above and further objects are realized in accordance with the present invention in a multiple leaf type filter by providing an oscillatory sluicing assembly which is removable from the filter tank as a unit with the filter leaves, which provides support for and spaces the filter leaves, which is self lubricating, which includes a novel oscillatory coupling to a source of sluicing fluid, which is automatically oscillated within predetermined limits, and which includes cam actuated valve means for controlling flow of the sluicing fluid onto the facing effective filtering areas of adjacent filter leaves whereby such flow directed into the cake only in the direction of travel of the lateral is selectively directed only downwardly into the filter cake on the filter leaves as the sluicing assembly travels downwardly in each oscillation cycle to thereby conserve the amount of sluicing fluid employed to clean the filter leaves.

These and other objects, features, and advantages of the present invention will become readily apparent from a careful consideration of the following detailed description, when considered in conjunction with the accompanying drawing illustrating a preferred embodiment of the present invention, wherein like reference numerals and characters refer to like and corresponding parts throughout the several views, and wherein:

FIG. 1 is a fragmentary view in side elevation of a filter including an oscillating sluicing assembly embodying the present invention;

FIG. 2 is an enlarged fragmentary view in partial section illustrating the means employed for oscillating the sluicing assembly of FIG. 1;

FIG. 3 is a view taken along line 3—3 of FIG. 1 illustrating a pair of coaxially aligned sluice laterals connected to the sluice manifold supply conduits of the oscillatory sluicing assembly of FIG. 1;

FIG. 4 is an enlarged fragmentary view in partial section illustrating the relationship of a pair of coaxially aligned sluice lateral tubes positioned between adjacent filter leaves of the sluicing assembly of FIG. 1;

FIG. 5 is an enlarged fragmentary view in partial section taken along 5—5 of FIG. 4 illustrating the construction of the fluid flow direction deflector angle bar carried by each pair of the coaxially aligned sluice lateral tubes;

FIG. 6 is an enlarged fragmentary view in partial section of the coupling between each of the manifold conduits and each of the corresponding sluice lateral tubes illustrating the details of a roller serving to space the adjacent filter leaves of FIG. 1;

FIG. 7 is an enlarged view in side elevation of the hydraulic oscillatory actuator unit employed to oscillate the sluicing assembly of FIG. 1;

FIG. 8 is an end view in elevation of the actuator unit of FIG. 7 illustrating the cam control means employed for controlling oscillation of the sluicing assembly and for selectively controlling actuation of control means regulating the direction of flow of the sluicing fluid into the coaxial sluice lateral tubes illustrated in FIG. 1;

FIG. 9 is an enlarged fragmentary view in partial section illustrating the flow interruptor valve means of FIG. 1 employed for selectively controlling the direction of flow of sluicing fluid to either of the spaced manifold supply conduits supplying the plurality of corresponding sluice lateral tubes of each lateral tube assembly;

FIG. 10 is a generally schematic diagram of the electrical circuit controlling operation of the oscillatory sluicing assembly of FIG. 1; and FIG. 11 is an enlarged fragmentary view, in partial section, of the sluice bearing flushing and lubricating groove illustrating in side elevation of a broken away portion of FIG. 1.

*General filter assembly*

Referring to the drawings, and particularly to FIG. 1 thereof, there is shown a conventional filter, generally indicated by the numeral 20, which includes a horizontally extending filter tank 21 supported by a plurality of suitable uprights 23 from the floor 22 of the room in which the filter unit 20 is employed. The filter tank 21 has a closed end or cover 24 and a removable end cover 25 secured to the tank as by a plurality of spaced and peripherally mounted clamps 26.

The filter 20 is a pressure filter of the multiple leaf type having circular and vertically extending filter leaves, of the type disclosed in Vallez U.S. Patent No. 1,227,983. As clearly appears in FIG. 3, each of a plurality of spaced filter leaves 28 is rigidly connected, as by bolts 30, at the upper end thereof to a horizontally extending impactor and guide bar 29. The bar 29 is connected at its end adjacent the removable end cover 25 to a shaft 31 of a conventional reciprocatory impacting device 33 for vibrating the filter leaves in order to remove the filter cake therefrom.

As appears in FIG. 3, each of the filter leaves 28 includes a pair of screens 28a and 28b maintained in spaced relation by a suitable core (not shown) and an annular rim 28c encompassing the spaced screens 28a and 28b. The liquid to be clarified flows from the filter chamber into the cavities in the leaves through the screens 28a and 28b and thence into an outlet manifold 36 via outlet couplings 28d which are tightly fitted into suitable apertures in an elongated flat bar 35 forming the top closure plate of the outlet manifold 36. The manifold 36 thus supports the leaves 28 and the impactor bar 29. The coupling 28d of each filter leaf 28 includes an annular groove 37 which receives a resilient O-ring 37a to provide a leakproof fitting between each leaf 28 and the manifold 36.

In order to remove the filter leaves as a unit from the tank 21, the outlet manifold 36 carries at one end an extension 36a which serves as the mounting for an axle 38 of a freely rotatable wheel 39 which rides on the bottom 40 of the tank 21 to facilitate removal of the filter leaves 28 as a unit from the tank 21. The extension 36a of the outlet manifold 36 supports an upright 41 carrying a bracket 42 which movably supports for oscillation a conduit 44 supplying sluicing fluid to a new and improved oscillatory sluicing assembly, generally indicated by the numeral 45, the details of construction and operation of which are to be described hereinafter.

The outlet manifold conduit 36 is connected at its other end adjacent the removable end cover 25 to an outlet conduit 46 which is mounted in the removable end cover 25 for discharge of the clarified fluid from the tank 21.

To facilitate removal of the filter leaves 28 and oscillatory sluicing assembly 45, as a unit from the tank 21, the end cover 25 carries a fixed bracket 47 on which is pivotally mounted a trolley 48 having trolley wheels 49 and 50 which ride on a track 51 of a horizontally extending beam 52 supported, as indicated at 53, on the tank 21 and, as indicated at 54, on an upright 55 supported by the floor 22. The bracket 47 is connected to an endless roller chain 56 supported between a freely rotatable idler roller chain sprocket 57 and a roller chain drive sprocket 58, each of which sprockets is mounted for rotation on the beam 52. The drive sprocket 58 shown partly broken away is operatively connected to the same shaft as the sprocket 59, shown in FIG. 1, which is driven by a roller chain 60. The roller chain 60 is actuated by the shaft (not shown) of a motor 62 or by a hand crank.

With the above described construction, when the clamps 26 are released, the plurality of filter leaves 28 and the oscillatory sluicing assembly 45, may be removed with the end cover 25 as a unit from the filter tank 21 with a minimum of disassembly.

Liquid to be clarified is introduced into the filter tank 21 near the bottom thereof through a conduit 63, is filtered in passing into the plurality of filter leaves 28, and the filtered fluid passes from the cavities in the filter leaves to an outlet manifold 36 and is discharged from the filter through the outlet 46. A drain outlet 64 opens into the filter chamber and is provided for periodic removal of sediment from the bottom of the filter tank 21.

*Oscillatory sluicing assembly*

Reference is made to FIGS. 1–4 which illustrate the novel oscillatory sluicing assembly 45 for removing filter cakes from the filter leaves 28. As shown in FIG. 1, the oscillatory sluicing assembly 45 is connected by a stationary inlet supply pipe 65 mounted in the wall of the cover 24 and to the bracket 42 which is adapted to supply a sluicing fluid, such as water, under a pressure maintained at a level sufficient to clean the effective filtering areas of the filter leaves.

The inlet supply pipe 65 supplies the sluicing fluid to the rectangularly shaped oscillatory sluicing assembly 45 which frames the plurality of filter leaves 28, when mounted in the tank 21, and which includes the inlet distributor conduit 44 which is coupled for oscillation, in accordance with the present invention, at one end in fluid communication with the inlet supply pipe 65 and connected at its other end in fluid communication with a vertically extending distributor conduit 66. The distributor conduit 66 is connected in fluid communication at each of its opposite ends respectively to one of a pair of elongated and horizontally extending manifold supply conduits 67 and 68, each of which extends parallel to the longitudinal axis of the tank 21. Adjacent the removable end cap 25, the ends 69 and 70, respectively, of each of the manifold conduits 67 and 68 are closed. A support bar 71 which extends perpendicular to the distributor conduit 44 connects the closed ends 69 and 70 of the manifold conduits 67 and 68.

At its end adjacent the removable cover 25, the sluicing assembly 45 is centrally supported for oscillation in the filter tank 21 by a connection between the support bar 71 and a housing 75 for a shaft 76 of an hydraulic oscillatory actuator unit 77 which is mounted on the wall of the removable end cap 25. As more fully described hereinafter, the oscillatory actuator unit 77 is controlled to oscillate the sluicing assembly 45 within limits determined by operation of valve means actuated by cam means carried by the shaft of the actuator unit 77.

A feature of the present invention resides in the cooperative relationship of the inlet supply pipe 65 and the inlet distributor conduit 44 of the sluicing assembly 45. The inlet supply pipe 65 and the inlet distributor conduit 44 of the sluicing assembly 45 are coupled to permit oscillation of the sluicing assembly, are adapted to hermetically seal the connection between the inlet supply pipe 65 and the inlet distributor conduit 44 while the sluicing assembly 45 oscillates, and are adapted to provide a quick connect-disconnect coupling between the pipe 65 and conduit 44 to facilitate removal of the sluicing assembly 45, as a unit with the filter leaves 28, from the tank 21.

The novel coupling between the pipe 65 and inlet distributor conduit 44 of the present invention is illustrated in FIG. 1. The bore of the inlet supply pipe 65 is dimensioned to receive the end 44a of the inlet distributor conduit 44. An O-ring 80, externally carried by the inlet distributor conduit 44, is compressed between the walls of the bore of the inlet supply pipe 65 and the end 44a of the inlet distributor conduit 44 to hermetically seal the space therebetween while permitting free oscillation of the inlet distributor conduit 44. The O-ring 80 is constructed of elastomeric material, such as rubber inert to the sluicing fluid, and is seated in an annular groove 81 formed in the inlet distributor conduit 44 adjacent the end thereof in the tank 21. When seated in the groove 81, the O-ring 80 extends partially above the periphery of the inlet distributor conduit 44, so that when the conduit 44 is inserted in the inlet pipe 65, the O-ring 80 is compressed. The snug fit between the O-ring and internal wall of the bore of inlet supply pipe 65 provides a leak-proof connection therebetween, and, holds the conduit and pipe coupled as the manifold assembly 45 oscillates. The O-ring 80 moves with the conduit 44 during oscillation of the manifold assembly 45 in friction contact with the internal bearing surface of the bore of the inlet pipe 65, and thus, not only seals the connection between the pipe 65 and inlet conduit distributor 44, but also maintains the pipe 65 and conduit 44 in engagement as the manifold assembly 45 oscillates.

To lubricate the bearing surface of the pipe 65, an aperture 82 is formed in the distributor conduit 44 for communicating the interior of the distributor conduit with an annular external groove 83 formed therein through which the sluicing fluid is supplied to serve as a lubricant for the bearing surface of the pipe 65. The sluicing fluid may thereafter flow through the distributor conduit 66 to the inlet of one or the other of the manifold conduits 67 or 68.

To supply the sluicing fluid onto the facing filtering surfaces of adjacent filter leaves 28, there are supported between the pair of manifold conduits 67 and 68, a plurality of axially aligned sluice lateral tube assemblies 85 for spraying the sluicing fluid in a plurality of narrow, well defined jets onto the effective filtering areas of the plurality of filter leaves 28. A tube assembly 85 is laterally supported by the manifold conduits 67 and 68 between each pair of adjacent filter leaves 28 for directing the jets of sluicing fluid onto substantially the entire effective facing filtering areas of adjacent filter leaves 28. The jets combine to form a narrow sheet which cuts into the cake and peels it off or otherwise removes the cake.

As appears in FIG. 4, each of the spray tube assemblies 85 includes a pair of coaxially aligned and spaced tubes 88 and 89. Each of the lateral spray tubes 88 is fixedly mounted for oscillation on, and in fluid communication with, the top manifold conduit 67 by a passaged coupling 91, and each of the tubes 89 is fixedly mounted for oscillation on, and in fluid communication with, the bottom manifold conduit 68 by a passaged coupling 92. The adjacent ends 93 and 94, respectively, of each tube 88 and 89, are closed to prevent flow of the sluicing fluid therefrom. The lateral tubes 88 and 89 are thereby maintained in spaced relation with the adjacent facing filter leaves 28 and with each other, as clearly appears in FIG. 4.

A plurality of apertures 90 are formed along the length of each of the tubes 88 and 89 for directing sprays or jets of the cleaning fluid in impinging, and, preferably, overlapping, relation onto the facing filtering areas of each pair of adjacent filter leaves 28 between each pair of which a pair of the tubes 88 and 89 extend. A first set of apertures 90 is formed in one side of each tube 88 and 89 and a second set of corresponding apertures 90 is formed in each tube 88 and 89, preferably located 180° from the first set of apertures so that the jets of sluicing fluid may be directed towards the filtering surfaces of each pair of facing filter leaves 28.

An elongated semicylindrical baffle plate 95, as appears in FIGS. 3, 4, and 5, extending substantially the full length of both of the axially aligned spray tubes 88 and 89, is connected to both tubes 88 and 89, as shown in FIG. 5, by a plurality of spaced bolts 96. Each baffle plate 95 provides means whereby the flow of the sluicing fluid from the apertures 90, formed in each of the axially aligned spray tubes 88 and 89, may be deflected at an angle obliquely onto the facing filter surface areas 98 and 99 of each pair of adjacent filter leaves 28 so that the plurality of jets of sluicing fluid form a narrow sheet of fluid which meets the adjacent filter leaf at an acute angle and thus cuts into the relatively soft filter cake and peels it off the leaf or otherwise removes the cake from the leaf. In this way, the sluicing fluid efficiently cleans the facing filtering surfaces 98 and 99 of each pair of adjacent filter leaves 28.

The baffle plates 95 form the separate jets into a single sheet and also assure that the force of the thus formed sheet of cleaning fluid is directed obliquely or at an acute angle onto the filtering surfaces of the adjacent filter leaves in a downward direction. This is the most efficient flow direction to maximize the cleaning action of the jets of sluicing fluid since the cake falls by gravity away from the sluicing sheet as it is peeled off or otherwise removed from the filter leaves.

To permit oscillation of the manifold assembly 45 within the limits set by the structural relationship of the top and bottom filter leaf supports, i.e., the relative positions of the upper bar 29 and bottom outlet manifold conduit 36, the top and bottom manifold conduits 67 and 68 are offset with respect to the vertical axis of the filter leaves 28 with one manifold conduit, for example, the top manifold conduit 67, offset to the left of the vertical axis of the filter leaves 28, and the bottom manifold conduit 68 offset to the right of the vertical axis of the filter leaves 28. Thus, the bottom outlet manifold conduit 36 of the filter leaves determines one limit of the angle of oscillation of the sluicing assembly 45, and the upper support bar 29 determines the other limit of the angle of oscillation of the sluicing assembly. In the embodiment of the present invention appearing in the drawing, the permitted angle of oscillation of the sluicing assembly 45 is approximately 165°. It will be observed that the limitation in the angle of oscillation of the sluicing assembly 45 presents an approximately 15° wedge-shaped filtering area, identified by the numeral 101 in FIG. 3, at the top of the filter leaves 28 which is not swept by the radial jet sprays of filtering fluid when supplied from the tubes 88 or 89.

To clean the triangularly shaped area 101 included between the limits of oscillation of the tubes 88 and 89 defined by the sluicing assembly 45, as shown in full lines and in dotted lines in FIG. 3, a baffle plate 102, as clearly appears in FIG. 3, is bolted to each of the manifold conduits 67 and 68 for deflecting against this area 101 jets 103 of sluicing fluid which are selectively supplied through apertures 103a and 103b formed in each of the manifolds 67 and 68 as the sluicing assembly 45 oscillates. It will be appreciated that the comparably defined wedge-shaped filtering area 104 located at the bottom of the filtering area of each of the filter leaves 28 will be cleaned by the sprays from the tubes 88 and 89 during oscillation of the sluicing assembly 45.

Each of the coupling ends 91 and 92, respectively, of the tubes 88 and 89 also serve as support rods for a pair of freely rotatable rollers 110 and 111, respectively (best shown in FIG. 6), which rollers are, preferably, constructed of nylon. The rollers 110 and 111 ride the frame rims 28c of the adjacent filter leaves 28 during oscillation of the sluicing assembly 45. Rollers 110 and 111 further serve to support the adjacent filter leaves when the manifolds 67 and 68 are in a horizontal position, i.e., when the sluicing assembly 45 is in the stationary or "Off" position. Thus, each adjacent filter leaf 28 is supported on opposite sides thereof by the rollers 110 and 111 of the sluice spray tubes 88 and 89.

Lateral movement of each of the rollers 110 and 111 relative to the couplings 91 and 92 is confined within the limits set by the spacing between a flange 112 on each of the couplings 91 and 92 and a spacer nut 113 which is in threaded engagement with a threaded end 114 of the couplings 91 and 92 which is threaded to the manifold conduits 68 and 69, respectively. In this roller leaf spacer and support arrangement, the sluicing fluid is also employed as a lubricating fluid for the rollers 110 and 111 and, for this purpose, an aperture 115 is formed in each of the couplings 91 and 92, respectively, to permit flow of the sluicing fluid from the interior of the couplings 91 and 92 to the space between the outer surface of the couplings 91 and 92 and the inner surface of the rollers 110 and 111, respectively. The couplings 91 and 92 are formed integrally with the spray tubes 88 and 89 and are each securely threaded to the manifolds 68 and 69.

*Actuation of the oscillatory sluicing assembly*

As appears in FIG. 2, the hydraulic actuator unit 77 is provided to oscillate the sluicing assembly 45 through the connection of the actuator shaft 76 to the support bar 71 of the sluicing assembly 45. The actuator unit 77 is mounted as by a bolt 116 to a flange 117 on a sleeve 118 which is shown formed integral with the end cover 25. A gasket 119 seals the connection between the filter and shaft from the ambient. The outer end 120 of the actuator shaft is bored and threaded to receive an adjusting screw 121 which extends into the housing 75 of the shaft 76. A spacer 122 is disposed between the end 120 of the actuator shaft and a shoulder 123 provided by the screw 121, and is maintained against the shoulder 123 by an end fitting 124 apertured, as indicated at 125, to receive shaft 76. The end fitting 124 is threaded into the housing 75 which, at its end opposite the actuator shaft 76, has an external flange 126, secured as by bolts 127, to the support bar 71 of the oscillatory sluicing assembly 45.

*Actuator unit control system*

A control system is carried by the actuator unit 77 for regulating the direction of flow of hydraulic fluid to vane chambers (not shown) of the actuator unit 77 and, thus, the direction of oscillation of the sluicing assembly 45. The oscillatory actuator unit 77 is of conventional construction and may include a plurality of hydraulic fluid chambers (not shown) into which flow of hydraulic fluid through a pair of conduits 77a and 77b is controlled to selectively act on a plurality of vanes mounted on the hydraulic actuator shaft 76 to cause oscillation of the shaft 76. A four-way hydraulic valve control unit 139, shown schematically in FIG. 10, controls the flow of fluid into the vane chambers in response to actuation by limit switch means and, thus, controls the direction of oscillation of the actuator shaft 76 and sluicing assembly 45.

The limit switch means are actuated, in a manner now to be described, by cam means mounted on the end of the actuator shaft 76 which passes through the end 140 of the actuator unit 77 external of the filter tank 21 and carries a cam plate 141 which oscillates with the shaft 76. As appears in FIG. 8, a mounting plate 146 for the limit switch means is secured as by bolts 147 to the end 140 of the actuator 77 between the actuator housing end 140 and the cam plate 141. The actuator shaft 76 carries spaced cam arms 142 and 143, for actuating control means which regulate the direction of travel of the actuator shaft during each cycle of oscillation of the sluicing assembly 45. The cam arms 142 and 143 may be bolted to the shaft 76, as indicated by the numeral 144, and a centering cam 141a may be bolted to the cam plate 141 which serves as a means for aligning the sluicing assembly 45, when the sluicing operation is completed, in a horizontal position relative to the tank 21 and thus assures at least a four-point support for the filter leaves 28, i.e., the support provided by the upper filter leaf support bar 29, manifold outlet conduit 36, and the plurality of rollers 110 and 111. The mounting plate 146 carries a switch 150 which is actuated by a yoke arm 151 carrying a roller 152 at one end above the yoke arm and another roller 153 below the yoke arm 151. The yoke arm 151 is pivotable in a plurality of directions, as indicated in FIG. 8, to actuate the switch 150 which may be a conventional double pole throw switch.

The yoke arm 151 may be actuated by either an arm 142 or an arm 143 carried by the actuator shaft 76. Thus, as the shaft 76 oscillates in a clockwise direction, the arm 142, which is synchronized to contact the roller 152, but spaced above from roller 153 to prevent contact thereof with roller 153, moves the yoke arm 151 and energizes the switch 150 as the sluicing assembly 45 approaches its furthest position of clockwise movement. Similarly, the arm 143 is synchronized to contact the roller 153, but spaced below roller 152 to prevent contact thereof with roller 152, as the sluicing assembly 45 approaches its furthest position of counterclockwise movement and to thereby move the yoke arm 151 and energize the switch 150 as the sluicing assembly 45 approaches its furthest position of counterclockwise movement. The arms 152 and 143 are spaced approximately 165° apart to correspond to the above described limits of oscillation of the sluicing assembly 45 and thus permits oscillation of the assembly 45 only within these limits.

The switch 150 operates to control the direction of flow of fluid through the four-way valve control unit 139, shown in FIG. 10.

In operation, therefore, as the shaft 76 oscillates in either a clockwise or counterclockwise direction, either arm 142 or arm 143 will move the yoke arm 151 to actuate the switch 150 and control operation of the valve control unit 139 to thereby selectively and alternately control the direction of flow of fluid to the actuator unit 77, and, thus, the direction of oscillation of the shaft 76 and sluicing assembly 45 within the above described limits of oscillation of the sluicing assembly 45 determined by the upper support bar 29 and manifold outlet conduit 36.

The cam plate 141 also carries a cam 190 spaced from a similar cam 191, which cams are in spaced relation with arms 142 and 143, respectively, and synchronized within the limits of oscillation of the manifold assembly 45, and which are adapted to selectively and alternately actuate a switch 192 through contact of a switch actuator pin 193 by a cam follower arm 194 pivotally mounted on an arm 195 secured to the mounting plate 146. The cam follower arm 194 carries a freely rotatable roller 196 which may be pivoted by either of the cams 190 or 191 to contact a plunger 197 on arm 194 with the actuator pin 193 to energize the switch 192 which, in turn, actuates (FIG. 1) the solenoid of a valve 199 to momentarily interrupt flow of sluicing fluid through the inlet supply pipe 65 to the inlet distributor conduit 44.

A shuttle valve assembly 160 for selectively controlling the direction of flow of the sluicing fluid to either the manifold conduit 67 or the manifold conduit 68 from inlet 44 is connected in the distributor conduit 66 at the inlet thereof (FIG. 1).

As clearly appears in FIG. 9, the shuttle valve assembly 160 includes an open-ended and generally cylindrical housing 161 having flat side walls 162 and 163 secured thereto by bolts 164. A plurality of gaskets 166 and 167 assure a leak-tight valve chamber 168. The housing 161 has a port 169 connected in fluid communication with the inlet conduit 44. These sections 66a and 66b of the distributor conduit 66 are mounted in axial alignment and extend into the housing 161 in communication with the valve chamber 168.

Fixed as by set screws 170a on a shaft 170, axially aligned with the distributor conduit sections 66a and 66b and slidably disposed in guides 171 and 172 in sections 66a and 66b, respectively, is a shuttle valve block or head 173. The solenoid of the valve 199 is actuated by switch 192 to momentarily interrupt the flow of the sluicing fluid through the inlet conduit 44 when the valve head 173 is maintained in the position shown by the dotted lines in FIG. 9 by the pressure of the fluid flowing through the conduit section 66b. This fluid pressure is reduced when the flows so interrupted and gravity then acts on the shuttle valve head 173 to cause it to drop and to seat in the position shown by the full lines in FIG. 9 blocking flow to the distributor section 66b and, thus, to manifold conduit 68. The sluice assembly 45 is synchronized to be actuated by the actuator unit 77 to oscillate in a clockwise direction when flow of sluicing fluid through section 66a occurs and the fluid is thus supplied to the upper manifold conduit 67 and lateral tubes 88. When the actuator unit 77 has oscillated the shaft 76 and the suicing manifold assembly 45 through the full 165° travel during a half cycle of oscillation, the limit switch 192 is actuated to actuate the valve control unit 199 to thereby interrupt flow through the inlet 44 and the valve head 173 then falls from contact with the distributor conduit section 66b now located near the top of the tank 21 to seat against and block flow through the distributor conduit section 66a and permit flow through section 66b.

In each half of the oscillation cycle of the sluicing assembly 45, the shuttle valve head 173 drops after flow interruption to block either of the conduit sections 66a or 66b which is at that particular time during the oscillation cycle located adjacent the bottom of the filter tank 21. Thus, flow of sluicing fluid from the apertures 90 in either of the lateral tubes 88 or 89 onto the filter leaves 28 is always confined to a downward direction as the assembly 45 oscillates whereby the flow cuts downward at an angle into the filter cake on the facing filter leaves and peels the cake from the leaves or otherwise removes the cake from the leaves. Thus, it will be observed that the amount of sluicing fluid required to remove the cake from the filter leaves is considerably reduced when compared with the amount previously required in prior art sluicing assemblies. In addition, not only is the amount of sluicing fluid required substantially reduced, but the sluicing fluid in jet or spray form is supplied in impinging relation in a sheet form onto the filter leaf surfaces in only the most efficient manner and direction during each cycle of operation of the oscillatory sluicing assembly 45.

The cam plate 141 also carries the centering cam 141a which is provided to return the sluicing assembly 45 to the horizontal position relative to the tank 21 upon completion of the filter leaf cleaning operation. The cam 141a extends further out from the cam plate 141 than either of the cams 190 or 191 and is adapted to actuate pivotal movement of a cam follower arm 211 carrying a roller 212 which rides on the cam plate 141. The arm 211 carries a contact plunger 213 which is adapted to contact the actuator pin 214 of a centering switch 215 which controls, through the valve control unit 139, movement of the actuator unit shaft 76 to the position wherein the manifold assembly 45 is horizontally positioned relative to the tank 21. During the sluicing operation, the switch 215 is short-circuited by the main On-Off switch with which it is connected in parallel, and, thus, contact of the cam 141a with roller 212 does not affect oscillation of the sluicing assembly 45 until the main On-Off switch 217 (FIG. 10) is opened to conclude the sluicing operation.

*General operation*

Considering now the overall operation of the sluicing mechanism and referring to FIG. 10, when the filter cake accumulated on the filter leaves 28 reaches some predetermined thickness and it is desirable to clean filter leaves, the flow of liquid to be clarified is terminated by interrupting the flow of liquid through the inlet 63 and the main control switch 217 is closed. Current then flows between a pair of power lines 220 and 221 through the On-Off switch 217 to the yoke arm switch 150 having a pair of contact sets 223 and 224. One or the other of the contact sets 223 and 224 is closed and the other is opened, depending upon the position of the yoke arm 151, as previously described above, and the switch 150 thus controls the supply of current to one or the other of a pair of direction control coils 226 and 227 in the valve control unit 139. As shown, the contact set 224 is closed indicating that the previous sluicing operation terminated while the sluicing assembly 45 was rotating in a clockwise direction. As soon as the contact set 224 is closed, the clockwise control coil 227 is energized to initiate the flow of hydraulic or pneumatic fluid to the conventional actuator unit 77 through the conduits 77a and 77b in such a manner that the pressure in the conduit 77b is increased to a higher level than the pressure in the conduit 77a thereby causing the sluicing assembly 45 to move in a clockwise direction. At the end of this clockwise stroke of the assembly 45, the switch control arm 142 (FIG. 8), acting through the roller 152, pivots the yoke arm 151 beyond its stable position whereby it moves by means of a flat center spring arrangement (not shown) to the dotted line position shown in FIG. 8. With the yoke arm 151 in the dotted line position, the condition of closure of the contact sets 223 and 224 is reversed, whereby the contact set 223 is closed to energize the clockwise control coil 226 in the valve control unit 139. Accordingly, the pressure in the conduit 77a is caused to exceed the pressure in the conduit 77b whereby the sluicing assembly 45 is caused to move in the counterclockwise direction. This alternation of the switch 150 continues, causing oscillation of the sluicing assembly 45 until the switch 217 is manually opened.

As shown in FIG. 10, the On-Off switch 217 is paralleled by a centering switch 215 which, as previously described, is controlled by the centering cam 141a acting through the roller 212 and the control arm 211. The switch 215 is closed, except when the sluicing assembly 45 is in a horizontal position, at which time the arm 211 is in its most upper position, as viewed in FIG. 8. After the On-Off switch 217 has been opened to terminate the sluicing cycle, one or the other of the coils 226 and 227 remain energized through the contacts of the centering switch 215 until the sluicing assembly 45 is in the horizontal position relative to the tank 21 whereby the cam 141 opens the switch 215 thereby deenergizing the circuit and completing the sluicing operation.

As previously described, an important feature of the present invention is the provision of means for selectively supplying fluid to the manifolds 67 and 68, depending upon the direction of movement, i.e., counterclockwise or clockwise, of the sluicing assembly 45. As shown in FIG. 10, the series circuit, comprising the switch 150 and the switches 226 and 227, is paralleled by a series circuit of a normally closed switch 192 and a water interrupter control coil 230 which, when energized, closes the valve 199 to interrupt the flow of sluicing fluid to the gravity operated valve 160. The coil 230 is energized when the cams 190 or 191 actuate the arm 194. Flow interruption occurs at the completion of each clockwise and counterclockwise stroke of the sluicing assembly 45 during each cycle of oscillation of the sluicing assembly 45. When the sluicing operation is completed, flow of the liquid to be clarified throguh conduit 63 is initiated and the filtering operation once again established.

Although various minor modifications of the present invention will become readily apparent to those versed in the art, it should be understood that it is desired to embody within the scope of the patent warranted hereon all such embodiments as reasonably and properly come within the scope of the contribution to the art hereby made.

We claim:

1. A pressure filter of the type including a plurality of filter leaves mounted in spaced face-to-face relation therein, a sluicing mechanism comprising a plurality of oscillating apertured tubular members respectively disposed between said leaves for directing a sluicing fluid thereon to remove filter cakes from said leaves, roller means mounted on said tubular members, and channel means complementally formed to said roller means and affixed to said leaves near the periphery thereof for maintaining said leaves and said tubular members in spaced apart alignment during the oscillation of said tubular members in the sluicing operatioin of said filter.

2. A filter of the type including a filter element, a sluicing mechanism including first means for moving in an oscillatory manner relative to said filter element for supplying sluicing fluid against the filter element to remove filter cake therefrom, control means for selectively and alternately directing said supply of sluicing fluid from said first means onto said filter elements only in the direction of travel of said first means during oscillation thereof, means for oscillating said first means within predetermined limits including an oscillatory actuator unit comprising a shaft coupled to said first means, contact arms carried by said shaft and spaced in predetermined relationship to each other and to the axis of rotation of the shaft, and means responsive to the positions of said contact arms relative to said actuator unit during oscillation of said shaft for selectively and alternately controlling operation of said actuator unit and oscillatory movement of said shaft relative to said actuator unit.

3. A pressure filter including a plurality of filter leaves, a sluicing mechanism including first means for moving in an oscillatory manner relative to said filter leaves for supplying sluicing fluid against each filter leaf to remove filter cake therefrom, control means for selectively and alternately directing supply of said sluicing fluid from said first means only in the direction of oscillation of said first means, actuator means for oscillating said first means within predetermined limits including switch means operably responsive for actuation to the position of said first means relative to said filter leaves, and means responsive to said switch means for controlling operation of said actuator means to thereby control the direction of oscillation of said first means.

4. A pressure filter including a filter tank having an inlet and an outlet for clarified fluid and a plurality of spaced apart filter leaves each of said filter leaves including oppositely arranged filter surfaces providing facing filter surfaces of adjacent filter leaves, disposed in the tank, a rectangularly shaped sluicing assembly in the tank for moving in an oscillatory manner relative to the filter leaves in the tank, said sluicing assembly including first and second sluicing manifolds extending perpendicularly to the planes of said filter leaves and arranged in substantially diametrically opposed relationship, a plurality of tubes extending from said manifolds between said filter leaves in substantially aligned relationship, said tubes provided with apertures for supplying sluicing fluid at an acute angle onto each of the facing filter surfaces of adjacent filter leaves, a distributor conduit in fluid communication with said first and second sluicing manifolds, and an inlet conduit connected for oscillation to a discharge pipe of a source of sluicing fluid, means connected to said sluicing assembly for imparting oscillatory movement thereto, means responsive to the position of the sluicing assembly relative to the filter tank for selectively and alternately controlling the direction of oscillation of the sluicing assembly, and means responsive to the position of the sluicing assembly relative to the filter tank for selectively and alternately controlling the direction of flow of said sluicing fluid from the said inlet conduit to said first and second sluicing manifolds.

5. A filter of the type including a filter element on which is deposited, in the form of a cake, solids entrained in a liquid to be clarified, apparatus for removing said cake from said filter element including a filter screen, said apparatus comprising sluicing means having means to operatively mount said sluicing means contiguous to said filter screen, said sluicing means being movable in an oscillatory manner relative to said filter element for directing a sluicing fluid onto said cake, said sluicing means lying in a plane substantially parallel to the effective filtering area of said filter element, said sluicing means comprising a tubular member lying substantially parallel to the plane of said filter screen and having at least one aperture therein opening toward said filter screen for directing said sluicing fluid onto said cake at an acute angle relative to said plane of said filter screen, means for operatively actuating said sluicing means with said tubular member in an oscillatory manner, conduit means for supplying a sluicing fluid, under pressure, to said sluicing means, shuttle valve means for selectively and alternately directing flow of said sluicing fluid to said sluicing means being oscillated with said tubular member, and said shuttle valve means having means to operate said shuttle valve means by gravity.

6. A pressure filter of the type provided with a plurality of filter leaves mounted in a filter tank in spaced, face-to-face relationship, comprising first and second sluicing manifolds including means to operatively connect said manifolds together, said sluicing manifolds extending perpendicularly to the planes of said filter leaves and said manifolds being arranged in substantially diametrically opposed relationship to each other, a plurality of tubes extending from said manifolds between said leaves in substantially aligned relationship to each other, means for oscillating said manifolds and said tubes relative to said filter leaves for discharging sluicing fluid supplied to said tubes from said manifolds onto said filter leaves through apertures provided in said tubes, means for selectively and alternately controlling the supply of sluicing fluid to said manifolds, whereby only one of said manifolds is supplied with fluid at any one time, said last-mentioned means includes a valve device for selectively and alternately controlling the direction of flow of sluicing fluid to said manifolds, and means for temporarily interrupting flow of said fluid to said valve device for actuating said valve device to thereby change the direction of flow of said fluid from said valve device to said members.

7. A pressure filter of the type provided with a plurality of filter leaves mounted in a filter tank in spaced, face-to-face relationship, comprising first and second sluicing manifolds including means to operatively connect said manifolds together, said sluicing manifolds extending perpendicularly to the planes of said filter leaves and said manifolds being arranged in substantially diametrically opposed relationship to each other, a plurality of tubes extending from said manifolds between said leaves in substantially aligned relationship to each other, means for oscillating said manifolds and said tubes relative to said filter leaves for discharging sluicing fluid supplied to said tubes from said manifolds onto said filter leaves through apertures provided in said tubes, means for selectively and alternately controlling the supply of sluicing fluid to said manifolds, whereby only one of said manifolds is supplied with fluid at any one time, said last-mentioned means including valve device for selectively and alternately controlling the direction of flow of sluicing fluid to said manifolds, means for temporarily interrupting flow of said fluid to said valve device for actuating said valve device to thereby change the direction of flow of said fluid from said valve device to said members, said valve device having means to actuate said device by gravity, and said means for interrupting flow of fluid to said valve device being responsive to the position of said manifolds relative to said filter leaves for actuating said valve device.

8. A pressure filter of the type provided with a plurality of filter leaves mounted in a filter tank in spaced, face-to-face relationship, comprising first and second sluicing manifolds including means to operatively connect said manifolds together, said sluicing manifolds extending perpendicularly to the planes of said filter leaves and said manifolds being arranged in substantially diametrically opposed relationship to each other, a plurality of tubes extending from said manifolds between said leaves in substantially aligned relationship to each other, means for oscillating said manifolds and said tubes relative to said filter leaves for discharging sluicing fluid supplied to said tubes from said manifolds onto said filter leaves through apertures provided in said tubes, means for selectively and alternately controlling the supply of sluicing fluid to said manifolds, whereby only one of said manifolds is supplied with fluid at any one time, an inlet conduit operatively connected to said first and second sluicing manifolds for supplying sluicing fluid thereto, and said inlet conduit having means to operatively couple said conduit for movement with the aforesaid manifolds for oscillatory movement within the filter tank and relative to the filter tank and to a discharge pipe of a source of sluicing fluid.

9. A pressure filter of the type provided with a plurality of filter leaves mounted in a filter tank in spaced, face-to-face relationship, comprising first and second sluicing manifolds operatively connected together and extending perpendicularly to the planes of said filter leaves and said manifolds being arranged in substantially diametrically opposed relationship to each other, a plurality of tubes extending from said manifolds between said leaves in substantially aligned relationship to each other, means for oscillating said manifolds and said tubes relative to said filter leaves for discharging sluicing fluid supplied to said tubes from said manifolds onto said filter leaves through apertures provided in said tubes, means for selectively and alternately controlling the supply of sluicing fluid to said manifolds, whereby only one of said manifolds is supplied with fluid at any one time, conduit means including an inlet distributor conduit and an inlet supply pipe for supplying sluicing fluid to said first and second sluicing manifolds, connecting means for providing a connection between said inlet distributor conduit and said inlet supply pipe, connecting means for connecting said inlet distributor conduit and said inlet supply pipe together, and means for supplying sluicing fluid for lubricating the connecting means between said inlet distributor conduit and said inlet supply pipe.

10. A pressure filter of the type provided with a plurality of filter leaves mounted in a filter tank in spaced, face-to-face relationship, comprising first and second sluicing manifolds including means to operatively connect said manifolds together, said sluicing manifolds extending perpendicularly to the planes of said filter leaves and said manifolds being arranged in substantially diametrically opposed relationship to each other, a plurality of tubes extending from said manifolds between said leaves in substantially aligned relationship to each other, means for oscillating said manifolds and said tubes relative to said filter leaves for discharging sluicing fluid supplied to said tubes from said manifolds onto said filter leaves through apertures provided in said tubes, means for selectively and alternately controlling the supply of sluicing fluid to said manifolds, whereby only one of said manifolds is supplied with fluid at any one time, said means for selectively and alternately controlling the supply of sluicing fluid to said manifolds being oscillated with said first and second sluicing manifolds, and including gravity actuated shuttle valve means.

11. A pressure filter of the type provided with a plurality of filter leaves mounted in a filter tank in spaced, face-to-face- relationship, comprising first and second sluicing manifolds including means to operatively connect said manifolds together, said sluicing manifolds extending perpendicularly to the planes of said filter leaves and said manifolds being arranged in substantially diametrically opposed relationship to each other, a plurality of tubes extending from said manifolds between said leaves in substantially aligned relationship to each other, means for oscillating said manifolds and said tubes relative to said filter leaves for discharging sluicing fluid supplied to said tubes from said manifolds onto said filter leaves through apertures provided in said tubes, means for selectively and alternately controlling the supply of sluicing fluid to said manifolds, whereby only one of said manifolds is supplied with fluid at any one time, each of said filter leaves including a frame rim, and means for holding said leaves in spaced apart relationship during operation of said filter including freely rotatable roller on each of said tubular members, each of said rollers engaging the frame rims of adjacent filter leaves.

12. A pressure filter of the type including a plurality of filter leaves mounted in spaced face-to-face relation therein, a sluicing mechanism comprising a plurality of oscillating apertured tubular members respectively disposed between said leaves for directing a sluicing fluid thereon to remove filter cakes from said leaves, roller means mounted on said tubular members, channel means complementally formed to said roller means and affixed to said leaves near the periphery thereof for maintaining said leaves and said tubular members in spaced apart alignment during the oscillation of said tubular members in the sluicing operation of said filter, each of said filter leaves including a frame rim, and said means for holding said leaves in spaced apart relationship during operation of said filter including a freely rotatable roller on each of said tubular members, each of said rollers engaging the frame rims of adjacent filter leaves, and said tubular members are each apertured to supply sluicing fluid between the tubular member and the roller to lubricate the roller.

13. A pressure filter of the type including a plurality of filter leaves mounted in spaced face-to-face relation therein, a sluicing mechanism comprising a plurality of oscillating apertured tubular members respectively disposed between said leaves for directing a sluicing fluid thereon to remove filter cakes from said leaves, roller means mounted on said tubular members, channel means complementally formed to said roller means and affixed to said leaves near the periphery thereof for maintaining said leaves and said tubular members in spaced apart alignment during the oscillation of said tubular members in the sluicing operation of said filter, and actuator means for controlling the sluicing mechanism, so that the sluicing mechanism oscillates relative to the filter.

14. A filter of the type including a filter element, a sluicing mechanism including first means for moving in an oscillatory manner relative to said filter element for supplying sluicing fluid against the filter element to remove filter cake therefrom, control means for selectively and alternately directing said supply of sluicing fluid from said first means onto said filter elements only in the direction of travel of said first means during oscillation thereof, said sluicing mechanism including second control means for returning the first means to a predetermined position relative to said filter element after termination of a sluicing operation, means for oscillating said first means within predetermined limits including an oscillatory actuator unit comprising a shaft coupled to said first means, contact arms carried by said shaft and spaced in predetermined relationship to each other and to the axis of rotation of the shaft, and means responsive to the positions of said contact arms relative to said actuator unit during oscillation of said shaft for selectively and alternately controlling operation of said actuator unit and oscillatory movement of said shaft relative to said actuator unit.

15. A filter of the type including a filter element, a sluicing mechanism including first means for moving in an oscillatory manner relative to said filter element for supplying sluicing fluid against the filter element to remove filter cake therefrom, control means for selectively and alternately directing said supply of sluicing fluid from said first means onto said filter elements only in the direction of travel of said first means during oscillation thereof, said sluicing mechanism including second control means for returning the first means to a predetermined position relative to said filter element after termination of a sluicing operation, said second control means for returning the sluicing mechanism to a predetermined position relative to the filter element including cams carried by said shaft for actuating switch means controlling operation of said means for oscillating said first means, means for oscillating said first means within predetermined limits including an oscillatory actuator unit comprising a shaft coupled to said first means, contact arms carried by said shaft and spaced in predetermined relationship to each other and to the axis of rotation of the shaft, and means responsive to the positions of said contact arms relative to said actuator unit during oscillation of said shaft for selectively and alternately controlling operation of said actuator unit and oscillatory movement of said shaft relative to said actuator unit.

16. A filter of the type including a filter element, a sluicing mechanism including first means for moving in an oscillatory manner relative to said filter element for supplying sluicing fluid against the filter element to remove filter cake therefrom, control means for selectively and alternately directing said supply of sluicing fluid from said first means onto said filter elements only in the direction of travel of said first means during oscillation thereof, said sluicing mechanism including second control mechanism including second control means for returning the first means to a predetermined position relative to said filter element after termination of a sluicing operation, said predetermined position of said second control means extending horizontally relative to the longitudinal axis of said filter, means for oscillating said first means within predetermined limits including an oscillatory actuator unit comprising a shaft coupled to said first means, contact arms carried by said shaft and spaced in predetermined relationship to each other and to the axis of rotation of the shaft, and means responsive to the positions of said contact arms relative to said actuator unit during oscillation of said shaft for selectively and alternately controlling operation of said actuator unit and oscillatory movement of said shaft relative to said actuator unit.

17. A pressure filter including a horizontally extending filter tank having an inlet and an outlet for clarified fluid and a plurality of spaced apart filter leaves extending vertically relative to the longitudinal axis of the filter tank disposed in the tank, each of said filter leaves including oppositely arranged filter surfaces providing facing filter surfaces of adjacent filter leaves, a rectangularly shaped sluicing assembly in the tank for moving in an oscillatory manner relative to the filter leaves in the tank, said sluicing assembly including first and second sluicing manifolds extending perpendicularly to the planes of said filter leaves and said manifolds being arranged in substantially diametrically opposed relationship to each other, a plurality of tubes extending from said manifolds between said filter leaves in substantially aligned relationship to each other, said tubes provided with apertures for supplying sluicing fluid at an acute angle onto each of the facing filter surfaces of adjacent filter leaves, a distributor conduit in fluid communication with said first and second sluicing manifolds, and an inlet conduit connected for oscillation to a discharge pipe of a source of sluicing fluid, means connected to said sluicing assembly for imparting oscillatory movement thereto, means responsive to the position of the sluicing assembly relative to the filter tank for selectively and alternately controlling the direction of oscillation of the sluicing assembly, and means responsive to the position of the sluicing assembly relative to the filter tank for selectively and alternately controlling the direction of flow of said sluicing fluid from the said inlet conduit to said first and second sluicing manifolds.

18. A filter of the type including a filter element, a sluicing mechanism including sluicing means for moving in an oscillatory manner relative to said filter element for supplying sluicing fluid against the filter element to remove filter cake therefrom, control means for selectively and alternately directing said supply of sluicing fluid from said sluicing means onto said filter element only in the direction of travel of said sluicing means during operation thereof, said sluicing means including an oscillatory actuator control means for oscillating said sluicing means within predetermined limits including an oscillatory actuator unit comprising an oscillatory shaft operatively coupled to said sluicing means, contact means carried by the oscillatory shaft for movement therewith, said contact means including contact arms carried by the shaft and spaced in predetermined relationship to each other and to the axis of rotation of the oscillatory shaft, means responsive to the positions of said contact arms relative to said actuator unit during oscillation of said oscillatory shaft for selectively and alternately controlling operation of said actuator unit and oscillatory movement of said shaft relative to said actuator unit, said means responsive to the positions of said contact arms comprising limit switch means positioned in proximity to said actuator unit for contact by said contact means, and said limit switch means being adapted to actuate operation of said control means when contacted by said contact means.

19. A filter of the type including a filter element, a sluicing mechanism including sluicing means for moving in an oscillatory manner relative to said filter element for supplying sluicing fluid against the filter element to remove filter cake therefrom, control means for selectively and alternately directing said supply of sluicing fluid from said sluicing means onto said filter element only in the direction of travel of said sluicing means during operation thereof, said control means comprising a four-way hydraulic valve control unit, said sluicing means including an oscillatory actuator control means for oscillating said sluicing means within predetermined limits including an oscillatory actuator unit comprising an oscillatory shaft operatively coupled to said sluicing means, contact means carried by the oscillatory shaft for movement therewith, said contact means including a pair of cams carried in spaced apart relation on said oscillatory shaft, means responsive to the positions of said contact arms relative to said actuator unit during oscillation of said oscillatory shaft for selectively and alternately controlling operation of said actuator unit and oscillatory movement of said shaft relative to said actuator unit, said means responsive to the positions of said contact arms comprising limit switch means positioned in proximity to said actuator unit for contact by said contact means, and said limit switch means including a limit switch actuable by said cams.

20. A pressure filter of the type provided with a plurality of filter leaves mounted in a filter tank in spaced, face-to-face relationship, comprising first and second sluicing manifolds including means to operatively connect said manifolds together, said sluicing manifolds extending perpendicularly to the planes of said filter leaves and said manifolds being arranged in substantially diametrically opposed relationship to each other, a plurality of tubes extending oppositely from each of said manifolds between said leaves and in substantially aligned and opposed relationship to each other, the oppositely extending tubes operatively connected to their respective manifolds, means for oscillating said manifolds and said tubes relative to said filter leaves to direct sluicing fluid supplied to said tubes from said manifolds onto said filter leaves through apertures provided in said tubes, gravity controlled valve means for controlling a sluicing fluid in a plurality of directions to said manifolds, whereby only one of said manifolds operatively connected thereto is supplied with sluicing fluid at any one time, said gravity controlled means comprising a valve housing having an inlet and at least a pair of axially aligned outlets operatively connected to said manifolds, and a valve head in said housing aligned with said outlets for a free falling movement when acted upon by gravity to thereby block flow through one or the other of said outlets.

21. A pressure filter of the type provided with a plurality of filter leaves mounted in a filter tank in spaced, face-to-face relationship, comprising first and second sluicing manifolds including means to operatively connect said manifolds together, said sluicing manifolds extending perpendicularly to the planes of said filter leaves and said manifolds being arranged in substantially diametrically opposed relationship to each other, a plurality of tubes extending oppositely from each of said manifolds between said leaves and in substantially aligned and opposed relationship to each other the oppositely extending tubes operatively connected to their respective manifolds, means for oscillating said manifolds and said tubes relative to said filter leaves to direct sluicing fluid supplied to said tubes from said manifolds onto said filter leaves through apertures provided in said tubes, gravity controlled valve means for selectively and alternately controlling the supply of sluicing fluid to said manifolds, whereby only one of said manifolds and tubes operatively connected thereto is supplied with sluicing fluid at any one time, said gravity controlled valve means including a generally cylindrical valve housing having an inlet and at least a pair of axially aligned outlets operatively connected to said manifolds, a rod in the housing freely movable between said outlets and a valve head coaxially carried by the rod, said valve rod and valve head being movable when actuated upon by gravity to block flow through one or the other of said outlets.

22. A pressure filter of the type provided with a plurality of filter leaves mounted in a filter tank in spaced, face-to-face relationship, comprising first and second sluicing manifolds including means to operatively connect said manifolds together, said sluicing manifolds extending perpendicularly to the planes of said filter leaves and said manifolds being arranged in substantially diametrically opposed relationship to each other, a plurality of tubes extending oppositely from each of said manifolds between said leaves and in substantially aligned and opposed relationship to each other, the oppositely extending tubes operatively connected to their respective manifolds, means for oscillating said manifolds and said tubes relative to said filter leaves to direct sluicing fluid supplied to said tubes from said manifolds onto said filter leaves through apertures provided in said tubes, gravity controlled valve means for selectively and alternately controlling the supply of sluicing fluid to said manifolds, whereby only one of said manifolds and tubes operatively connected thereto is supplied with sluicing fluid at any one time, said gravity controlled valve means including a rotatable valve housing defining a valve chamber, an inlet in the housing to the valve chamber, first and second outlets in the housing in axial alignment with each other and with the axis of rotation of the housing and also operatively connected to said manifolds, and a valve head in the chamber freely movable between said outlets, said valve head being adapted to be held against one of said outlets by fluid pressure in said chamber acting thereagainst to block flow through the outlet when said housing rotates from a first position wherein said outlet blocked by said valve head is located below the axis of rotation of said housing to a second position wherein said blocked outlet is located above the axis of rotation of said housing, said valve head being actuated when the force of gravity exceeds said fluid pressure acting against said head to fall from contact with said blocked outlet when the housing is in said second position to contact and block flow through said second outlet.

23. A pressure filter of the type provided with a plurality of filter leaves mounted in a filter tank in spaced, face-to-face relationship, comprising first and second sluicing manifolds including means to operatively connect said manifolds together, said sluicing manifolds extending perpendicularly to the planes of said filter leaves and said manifolds being arranged in substantially diametrically opposed relationship to each other, a plurality of tubes extending oppositely from each of said manifolds between said leaves and in substantially aligned and opposed relationship to each other, the oppositely extending tubes operatively connected to their respective manifolds, means for oscillating said manifolds and said tubes relative to said filter leaves to direct sluicing fluid supplied to said tubes from said manifolds onto said filter leaves through apertures provided in said tubes, gravity controlled means for selectively and alternately controlling the supply of sluicing fluid to said manifolds, whereby only one of said manifolds and tubes operatively connected thereto is supplied with sluicing fluid at any one time, said gravity controlled means including a rotatable valve housing defining a chamber for introduction of sluicing fluid to said chamber and at least a pair of axially aligned outlets for discharge of sluicing fluid from the chamber and also operatively connected to said manifolds, and a valve in said chamber freely movable between said outlets and adapted to so move when acted upon by gravity to selectively block flow through one or the other of said outlets.

24. A pressure filter of the type provided with a plurality of filter leaves mounted in a filter tank in spaced, face-to-face relationship comprising first and second sluicing manifolds including means to operatively connect said manifolds together, said sluicing manifolds extending perpendicularly to the planes of said filter leaves and said manifolds being arranged in substantially diametrically opposed relationship to each other, a plurality of tubes extending oppositely from each of said manifolds between said leaves and in substantially aligned and opposed relationship to each other, the oppositely extending tubes operatively connected to their respective manifolds, means for oscillating said manifolds and said tubes relative to said filter leaves for discharging sluicing fluid supplied to said tubes from said manifolds onto said filter leaves through apertures provided in said tubes, means for selectively and alternately controlling the supply of sluicing fluid to said manifolds, whereby only one of said manifolds and tubes operatively connected thereto is supplied with fluid at any one time.

References Cited by the Examiner

UNITED STATES PATENTS

| | | | |
|---|---|---|---|
| 591,006 | 10/1897 | Parsons | 210—106 |
| 1,219,796 | 3/1917 | Atkins et al. | 210—391 X |
| 1,510,568 | 10/1924 | Sweetland | 210—391 X |
| 2,273,737 | 2/1942 | Snyder | 137—39 |
| 2,366,112 | 12/1944 | Jokel | 210—106 |
| 2,388,369 | 11/1945 | Shendrick | 91—275 |
| 2,570,557 | 10/1951 | Johnson | 137—39 |
| 2,609,101 | 9/1952 | Howland et al. | 210—334 |
| 2,683,353 | 7/1954 | O'Shei | 91—303 X |
| 2,731,157 | 1/1956 | Purmont. | |
| 2,868,379 | 1/1959 | Hunziker | 210—391 X |
| 2,885,082 | 5/1959 | Stafford | 210—413 X |

REUBEN FRIEDMAN, *Primary Examiner.*

HERBERT L. MARTIN, *Examiner.*